(12) United States Patent
Kang (10) Patent No.: US 7,663,703 B2
(45) Date of Patent: Feb. 16, 2010

(54) VIDEO PROCESSING APPARATUS AND VIDEO PROCESSING METHOD

(75) Inventor: Eun-young Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 838 days.

(21) Appl. No.: 11/407,924

(22) Filed: Apr. 21, 2006

(65) Prior Publication Data

US 2007/0030399 A1 Feb. 8, 2007

(30) Foreign Application Priority Data

Aug. 5, 2005 (KR) .................. 10-2005-0071938

(51) Int. Cl.
*H04N 5/50* (2006.01)
*H04N 5/44* (2006.01)

(52) U.S. Cl. .................. 348/731; 348/553

(58) Field of Classification Search .......... 348/553, 348/554, 725–728, 571, 731–733; *H04N 5/44, H04N 5/50, 5/14*
See application file for complete search history.

(56) References Cited

U.S. PATENT DOCUMENTS 5,335,010 A * 8/1994 Lindemeier et al. ......... 348/725
6,057,882 A * 5/2000 van den Branden Lambrecht et al. ......................... 348/192
7,367,039 B2 * 4/2008 Allen ......................... 348/192

FOREIGN PATENT DOCUMENTS

| JP | 10-233969 | 9/1998 |
|---|---|---|
| KR | 1997-0073036 | 11/1997 |
| KR | 1020030043140 A | 6/2003 |
| KR | 1020040102446 A | 12/2004 |

* cited by examiner

*Primary Examiner*—Sherrie Hsia
(74) *Attorney, Agent, or Firm*—Roylance, Abrams, Berdo & Goodman, L.L.P.

(57) ABSTRACT

A video processing method and apparatus are provided. Video signals including channel information relating to one of a plurality of channels, and video identification information relating to an identity of a picture between signals are received. A receiving quality of each video signal in accordance with the video signals having the same video identification information, but different channel information is evaluated. A picture is displayed by processing a video signal including a best receiving quality among the video signals. Thus, a video signal corresponding to an identical picture is received through a high quality channel to be processed and displayed.

10 Claims, 8 Drawing Sheets

| Freq.(CH) | 30 | 31 | 32 | 33 | ~ | 41 | 42 | 43 | ~ | 68 | 69 |
|---|---|---|---|---|---|---|---|---|---|---|---|
| NID | A | A | A | A |  | A | C | A |  | B | A |
| TID | $T_9$ | $T_1$ | $T_2$ | $T_3$ |  | $T_4$ | $T_1$ | $T_6$ |  | $T_3$ | $T_8$ |
| SID | h | a | b | c |  | d | a | e |  | c | g |
| SNR | 5 | 10 | 20 | 30 |  | 40 | 50 | 60 |  | 15 | 80 |

FIG. 3B

| Freq.(CH) | 30 | 31 | 32 | 33 | ~ | 41 | 42 | 43 | ~ | 68 | 69 |
|---|---|---|---|---|---|---|---|---|---|---|---|
| NID | A | A | A | A | | A | C | A | | B | A |
| TID | $T_9$ | $T_1$ | $T_2$ | $T_3$ | | $T_4$ | $T_1$ | $T_6$ | | $T_3$ | $T_8$ |
| SID | h | a | b | c | | b | a | e | | c | g |
| SNR | 5 | 10 | 20 | 30 | | 40 | 50 | 60 | | 15 | 80 |

FIG. 3C

| Freq.(CH) | 30 | | 32 | 33 | ~ | 41 | 42 | 43 | ~ | | 69 | +31 | +68 |
|---|---|---|---|---|---|---|---|---|---|---|---|---|---|
| NID | A | | A | A | | A | C | A | | | A | A | A |
| TID | T9 | | T2 | T3 | | T4 | T1 | T6 | | | T8 | T1 | T3 |
| SID | h | | b | c | | d | a | e | | | g | a | c |
| SNR | 5 | | 20 | 30 | | 40 | 50 | 60 | | | 80 | 10 | 15 |

FIG. 3D

| Freq.(CH) | 30 | 32 | 33 | ~ | 41 | 42 | 43 | ~ | 69 | +31 | +68 |
|---|---|---|---|---|---|---|---|---|---|---|---|
| NID | A | A | A |  | A | C | A |  | A | A | A |
| TID | T9 | T2 | T3 |  | T4 | T1 | T6 |  | T8 | T1 | T3 |
| SID | h | b | c |  | d | a | e |  | g | a | c |
| SNR | 5 | 20 | 30 |  | 40 | 50 | 60 |  | 80 | 10 | 15 |

VIDEO PROCESSING APPARATUS AND VIDEO PROCESSING METHOD

CROSS-REFERENCE TO RELATED APPLICATIONS

This application claims the benefit of Korean Patent Application No. 2005-0071938, filed on Aug. 5, 2005, in the Korean Intellectual Property Office, the entire disclosure of which is hereby incorporated by reference.

BACKGROUND OF THE INVENTION

1. Field of the Invention

The present invention relates to a video processing apparatus and a video processing method. More particularly, the present invention relates to a video processing apparatus and a video processing method, in which a video signal in accordance with an identical picture is received through a high quality channel to be processed and displayed.

2. Description of the Related Art

A video display apparatus such as a television (TV), or the like, receives a video signal corresponding to a predetermined picture from a digital TV broadcast, cable TV broadcast, and the like. The video display apparatus processes the received video signal, thereby displaying the picture. While receiving the video signal, a video processing apparatus is tuned to a channel selected by a user and receives the video signal having a frequency previously assigned to the selected channel from a transmitter of a broadcasting station.

Figure 1:
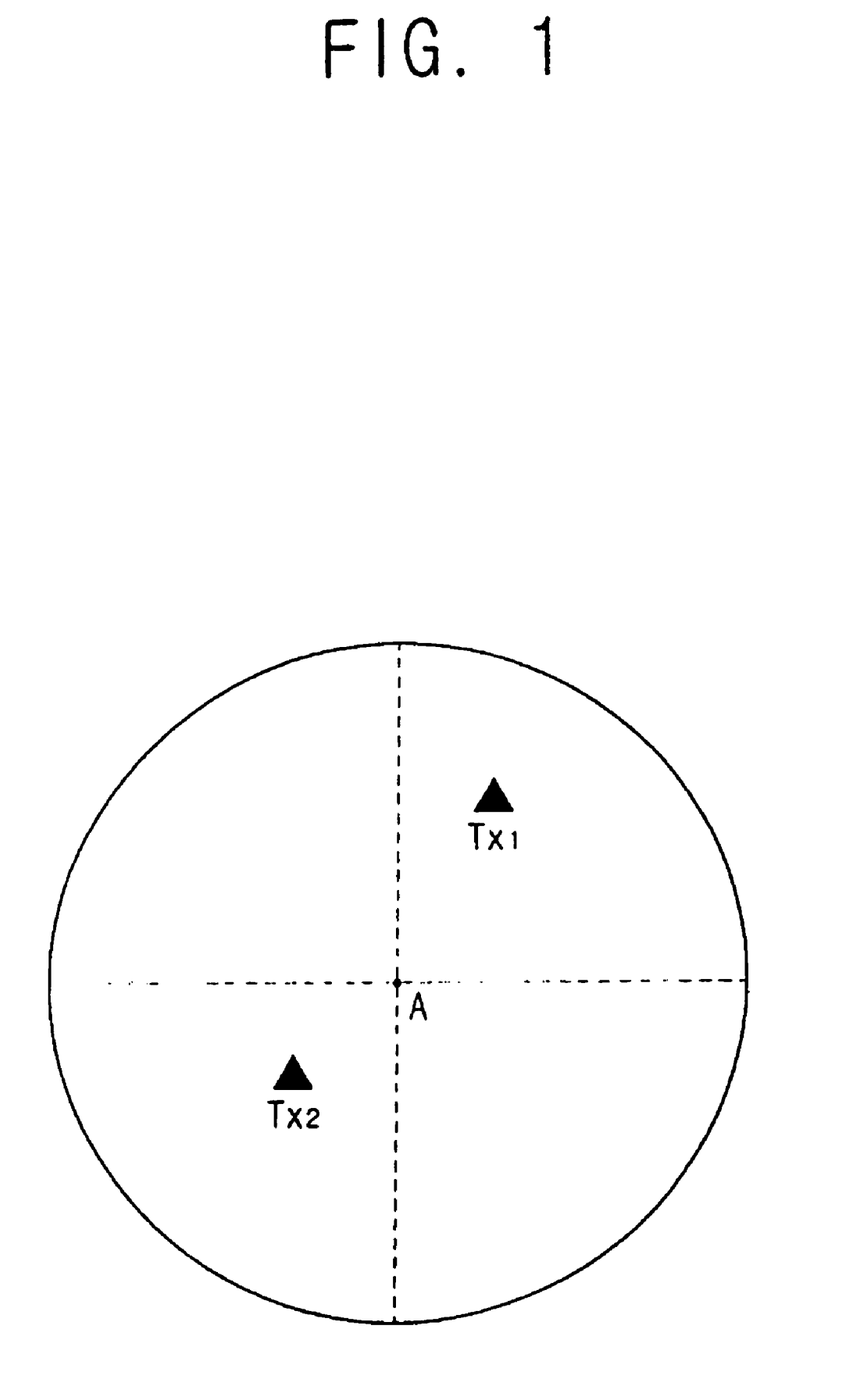
FIG. 1 illustrates a receiving operation of a general video processing apparatus.

The video processing apparatus can receive the video signals with different frequencies in accordance with an identical picture. For example, as shown in FIG. 1, when the video processing apparatus is placed at a point A, the video processing apparatus can receive a signal from not only a transmitter Tx1, but also from a transmitter Tx2. When the video signals transmitted from the transmitters Tx1 and Tx2 are different in the channel, but correspond to the identical picture, the video processing apparatus receives the video signals corresponding to the identical picture through two channels.

As the video processing apparatus receives the video signals through a plurality of channels in accordance with the identical picture, the channels corresponding to the identical picture are duplicated as long as a channel to be processed is not previously set. Since the video processing apparatus randomly selects and processes one channel among the plurality of channels, the video signal is processed without considering the quality of the video signal. Therefore, a picture may be inferior in quality. As the quality of the video signal is poor, a picture may be not displayed.

Accordingly, there is a need for an improved video processing apparatus and video processing method that processes and displays video signals according to their signal quality.

SUMMARY OF THE INVENTION

An aspect of embodiments of the present invention is to address at least the above problems and/or disadvantages and to provide at least the advantages described below. Accordingly, an aspect of embodiments of the present invention is to provide a video processing apparatus and a video processing method, in which a video signal, in accordance with an identical picture, is received through a high quality channel to be processed and displayed.

Additional aspects and/or advantages of an exemplary embodiment of the present invention will be set forth in part in the description which follows and, in part, will be obvious from the description, or may be learned by practice of the present invention.

The foregoing and/or other aspects of an exemplary embodiment of the present invention can achieved by providing a video processing method comprising receiving a video signal including channel information relating to one of a plurality of channels, and video identification information relating to an identity of a picture between signals. Each video signal receiving quality, in accordance with the video signals having the same video identification information, but different channel information is evaluated. A picture is displayed by processing the video signal having a best receiving quality among the plurality of video signals.

According to another aspect of an exemplary embodiment of the present invention, the evaluating of the receiving quality comprises evaluating a signal-to-noise ratio (SNR) of the video signal, and the displaying of the picture comprises determining the video signal including the highest SNR as the video signal with the best receiving quality among the plurality of video signals.

According to another aspect of an exemplary embodiment of the present invention, the video processing method further controls a predetermined memory to store the channel information, video identification information and information relating to the receiving quality of the video signals having same video identification information, but different channel information.

According to another aspect of an exemplary embodiment of the present invention, the channel information, video identification information and information relating to the receiving quality of the video signal are stored with priority in selecting the channel.

According to another aspect of an exemplary embodiment of the present invention, the channel information, video identification information and information relating to the receiving quality of the video signal are stored with additional information for noting that the channels are duplicated, corresponding to the identical picture.

The foregoing and/or other aspects of an exemplary embodiment of the present invention can be achieved by providing a video processing apparatus comprising a signal receiver to receive a video signal including channel information relating to one of a plurality of channels, and video identification information relating to an identity of a picture between signals. A signal evaluator evaluates a receiving quality of each video signal in accordance with the video signals having same video identification information, but different channel information. A video processor processes the video signal to be displayed as a picture. A controller controls the video processor to process the video signal including a best receiving quality among the plurality of video signals.

According to another aspect of an exemplary embodiment of the present invention, the signal evaluator evaluates a signal-to-noise ratio (SNR) of the video signal, and the controller determines the video signal having a highest SNR as the video signal including the best receiving quality among the plurality of video signals.

According to another aspect of an exemplary embodiment of the present invention, the video processing apparatus further comprises an information storage to store the channel information, video identification information and information relating to the receiving quality of the video signals including same video identification information, but different channel information.

According to another aspect of an exemplary embodiment of the present invention, the information storage stores the channel information, video identification information and information relating to the receiving quality of the video signal with priority in selecting the channel.

According to another aspect of an exemplary embodiment of the present invention, the information storage stores the channel information, video identification information and information relating to the receiving quality of the video signal with additional information for noting that the channels are duplicated corresponding to the identical picture.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be apparent from the following description taken in conjunction with the accompany drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 2:
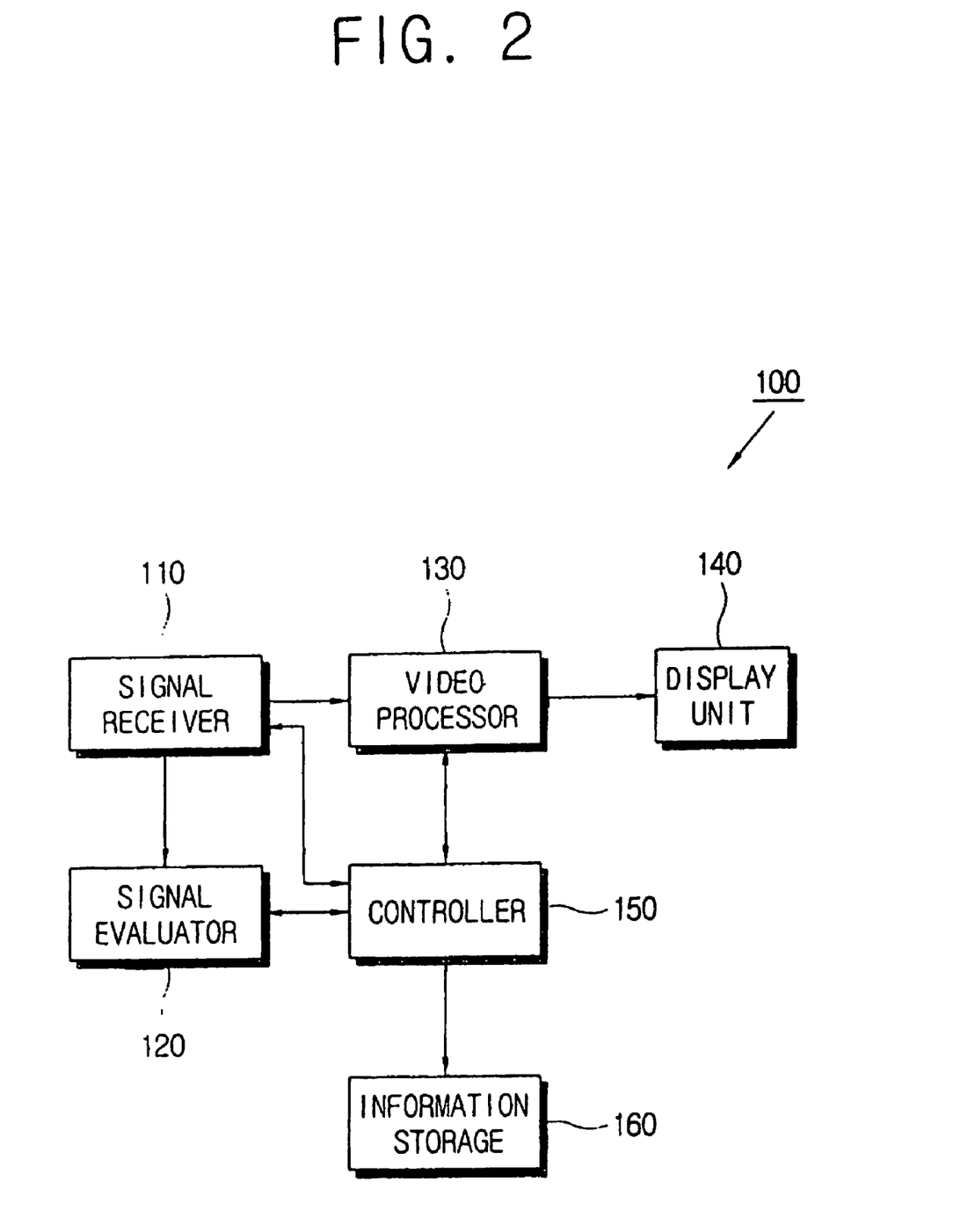
FIG. 2 is a schematic block diagram of a video processing apparatus according to an exemplary embodiment of the present invention.

FIG. 2 is a schematic block diagram of a video processing apparatus according to an exemplary embodiment of the present invention. A video processing apparatus 100 according to an exemplary embodiment of the present invention receives a video signal corresponding to a predetermined picture from a digital TV broadcast, cable TV broadcast, and the like, of a broadcasting station, and processes the received video signal, thereby displaying the picture. Further, the video processing apparatus 100 is tuned to a channel selected by a user, and receives the video signal, having a frequency previously assigned to the selected channel. Also, when a plurality of channels is provided for the identical picture, the video processing apparatus 100 selects a channel for a high quality signal and processes the high quality signal, thereby displaying a picture with high quality.

The video processing apparatus 100, as shown in FIG. 2, includes a signal receiver 110, signal evaluator 120, video processor 130, display unit 140, controller 150 and information storage 160. The signal receiver 110 is turned to a channel corresponding to a predetermined frequency, according to control of the controller 150, and receives the video signal through the channel. Further, when the controller 150 gives a command to scan the channel, the signal receiver 110 searches a plurality of signals higher than a predetermined level for each channel, while gradually varying the frequency within a predetermined frequency range. The signal receiver 110 decodes the searched signals, according to a predetermined format, and obtains information, or the like, about a picture.

The video processor 130 scales the resolution of a picture to be properly displayed on the display unit 140 in accordance with the video signal transmitted from the signal receiver 110, according to the control of the controller 150. Further, the video processor 130 can perform a deinterlacing operation, picture enhancement, and the like. Here, the display unit 140 displays a picture in accordance with the video signal output from the video processor 130.

In an exemplary implementation, the video signal includes channel information and video identification information. The channel information indicates a channel assigned to the video signal among the plurality of channels. The video identification information is used to determine whether a picture based on the video signal is identical with a picture based on another video signal. In the case of a digital TV broadcast, the video identification information can include a transmission identification (ID), a service ID for identifying broadcasting programs, and the like.

The signal evaluator 120 receives the video signal from the signal receiver 110, and evaluates the receiving quality of each video signal in accordance with a plurality of video signals having same video identification information, but different channel information. In the exemplary implementation, the signal evaluator 120 evaluates a signal-to-noise ratio (SNR) as the receiving quality of the video signal.

The controller 150 controls the signal receiver 110 and the video processor 130 to operate in accordance with an evaluating result of the signal evaluator 120. That is, the controller 150 controls the signal receiver 110 and the video processor 130 to respectively receive and process the video signal having a highest receiving quality among the plurality of video signals having same video identification information, but different channel information. Here, the controller 150 determines the video signal having the highest SNR as the video signal having the highest receiving quality. Further, the controller 150 controls the information storage 160 to store the channel information, video identification information and information in reference to the corresponding receiving quality in accordance with each of the video signals having same video identification information, but different channel information.

Figure 3A:
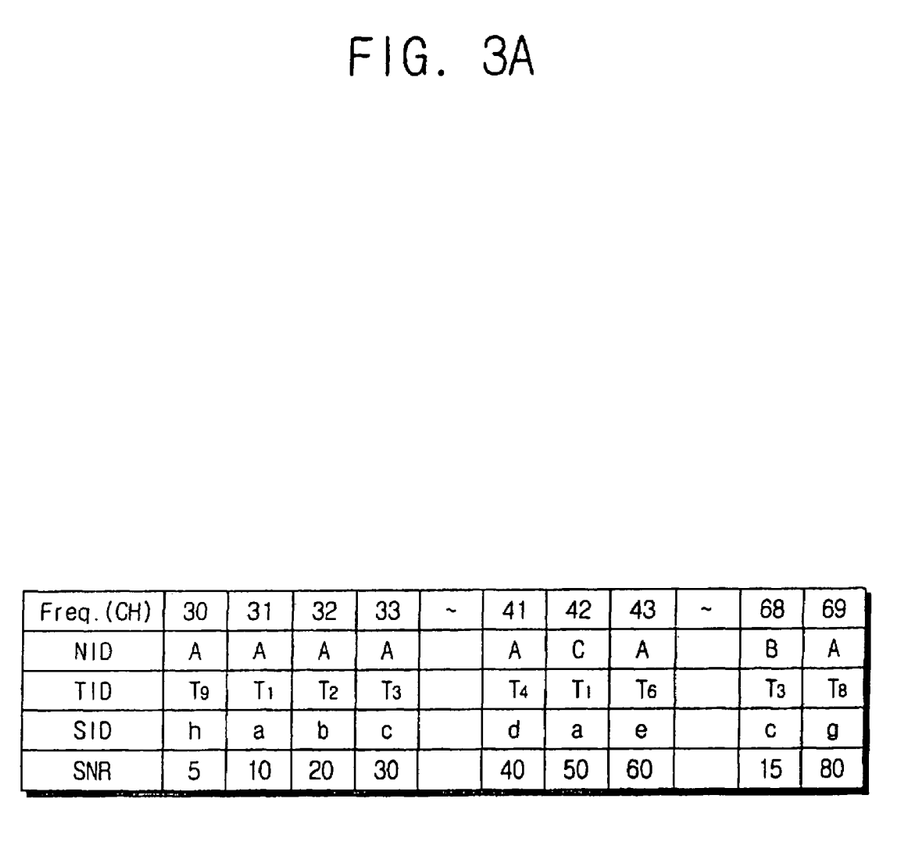
FIGS. 3A and 3D illustrate channel tables stored in an information storage according to an exemplary embodiment of the present invention.
Figure 3B:
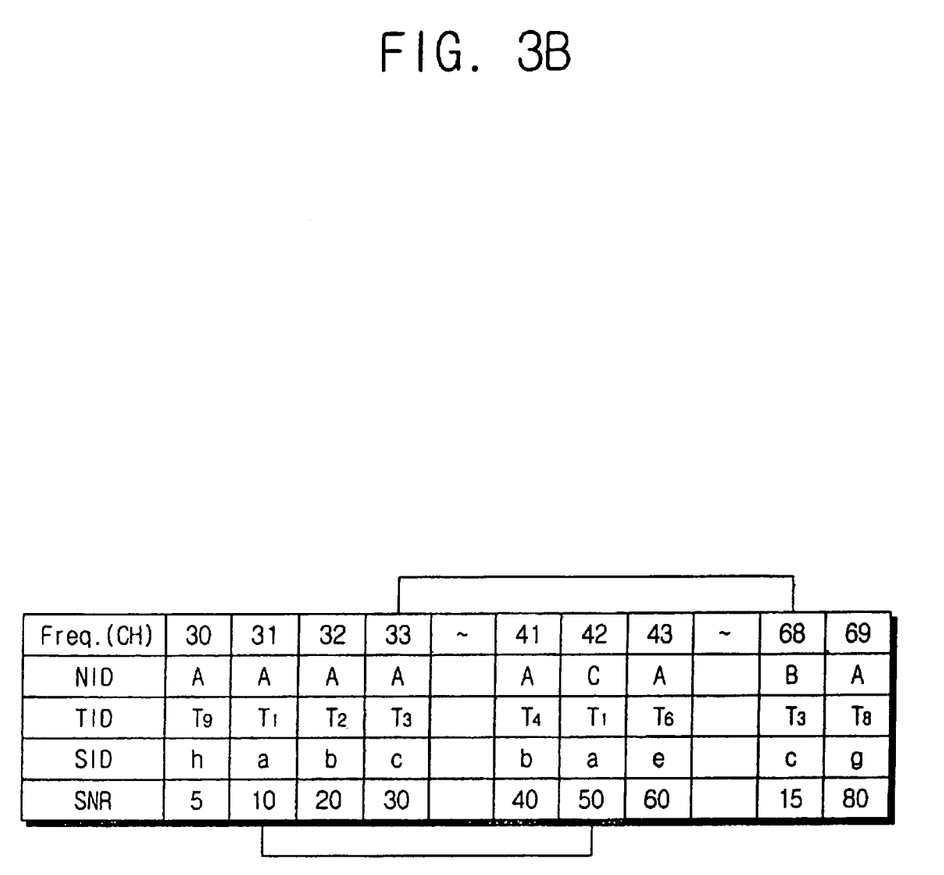

FIGS. 3A and 3B illustrate channel tables stored in the information storage 160. FIG. 3A is a channel table showing the signal receiver 110 result of scanning the video signal. In FIG. 3A, numerals "30" through "69," on top of the table, indicate channel numbers, and "NID" indicates a network ID for the broadcasting station or a transmitter transmitting the video signal. Further, "TID", "SID" and "SNR" indicate the transmission ID, service ID and signal-to-noise ratio, respectively.

FIG. 3B is a channel table showing the plurality of video signals having same video identification information, but different channel information. Regarding FIG. 3B, as the different channels "31" and "42" have the same TIDs and SIDs, the video signals, corresponding to the channels "31" and "42," are signals of the identical picture. However, the SNR of the channel "31" is 10, and the SNR of the channel "42" is 50. That is, channel "42" has a higher SNR than the channel "31". In this case, the controller 150 selects the channel "42" to be processed corresponding to the corresponding picture. Likewise, the video signals corresponding to the channels "33" and "68" are of the identical picture, but the channel "33" has the higher SNR than the channel "68". In this case, the controller 150 selects the channel "33" to be processed in accordance with the corresponding picture.

Figure 3C:
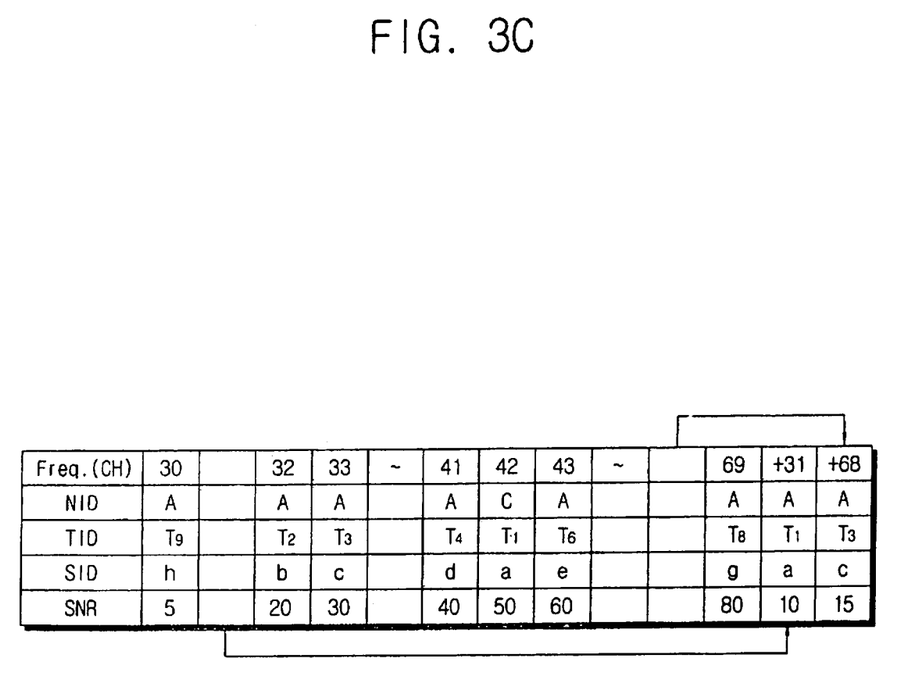
Figure 3D:
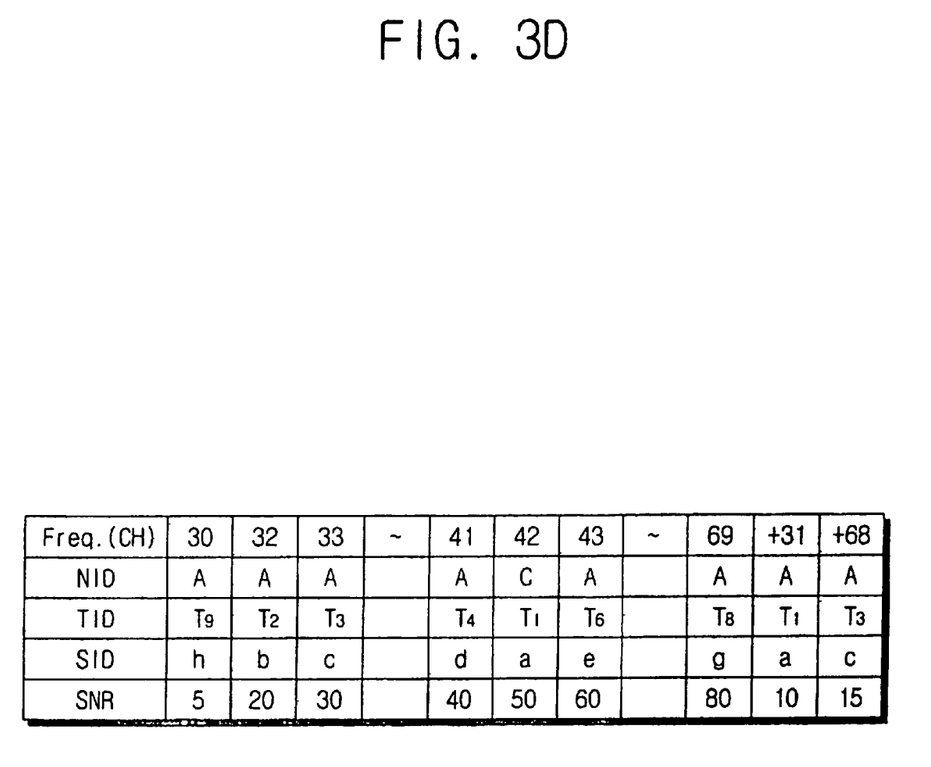

Meanwhile, the controller 150 gives priority to the plurality of channels corresponding to the identical picture, but not selected, and controls the information storage 160 to store information about the priority. For example, as shown in FIG. 3C, the controller 150 moves the channel numerals "31" and "68" to last of the channel table. In this case, the controller 150 adds "+" to the channel numerals, which are not selected, thereby noting that the channels are duplicated corresponding to the identical picture. In an exemplary implementation, a final channel table is illustrated in FIG. 3D.

According to an exemplary embodiment of the present invention, the controller 150 can be implemented by a software program to be executed by a microprocessor, such as, a central processing unit (CPU). In this case, the software program can be stored in a memory, such as, a read only memory (ROM). Here, the software program is programmed by a language that is proper for the microprocessor in order to perform the operations of the controller 150.

Figure 4:
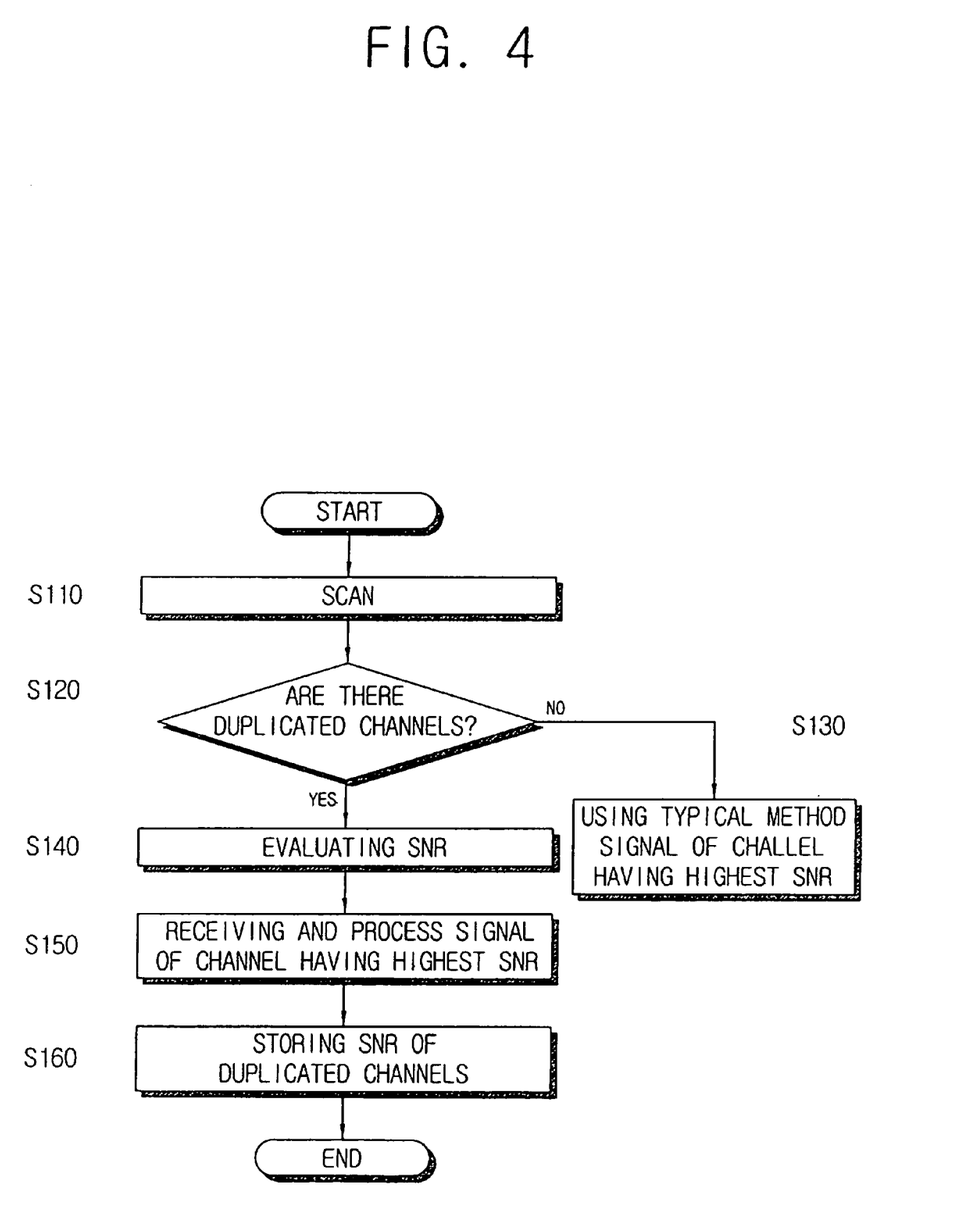
FIG. 4 is a schematic flowchart of an operation of the video processing apparatus according to an exemplary embodiment of the present invention.

FIG. 4 is a schematic flowchart of an operation of the video processing apparatus according to an exemplary embodiment of the present invention. At operation S110, the video processing apparatus 110 scans the channels corresponding to the received video signal. At operation S120, the video processing apparatus 110 determines whether there are duplicated channels corresponding to the identical picture, among the plurality of video signals searched by the scan according to the channel information and the video identification information. When a duplicated channel does not exist in accordance with the identical picture, at operation S130, the video processing apparatus 110 employs a typical method to be tuned to the channel, and receive and process the video signal of the tuned channel.

When the duplicated channels exist corresponding to the identical picture, at operation S140, the video processing apparatus 100 evaluates the receiving quality, that is, the SNR of each video signal. At operation S150, the video processing apparatus selects the channel having the highest SNR, among the channels duplicated corresponding to the identical picture, and processes the video signal of the selected channel. At operation S160, the video processing apparatus 100 stores the channel information, video identification information and the SNR in accordance with the channels duplicated according to the identical picture.

Figure 5:
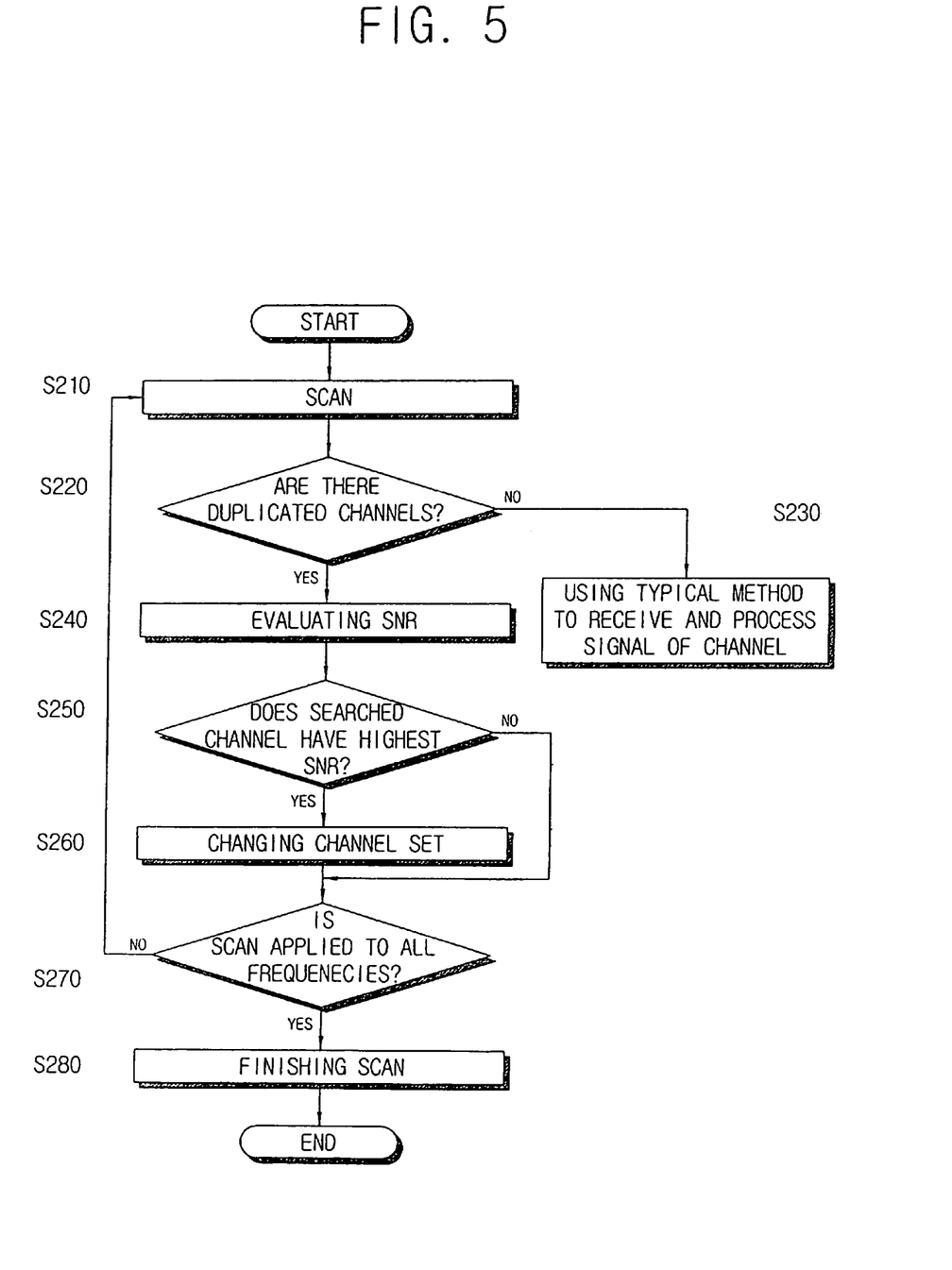
FIG. 5 is a schematic flowchart of another operation of the video processing apparatus according to an exemplary embodiment of the present invention.

FIG. 5 is a schematic flowchart of another operation of the video processing apparatus according to an exemplary embodiment of the present invention. At operation S210, the video processing apparatus 110 scans the channels in accordance with the received video signal. At operation S220, the video processing apparatus 110 determines whether the scanned channel and a previously stored channel are duplicated corresponding to the identical picture according to the channel information and video identification information. When the scanned channel and previously stored channel are different corresponding to the identical picture, at operation S230, the video processing apparatus 110 employs a typical method to be tuned to the channel, and receive and process the video signal of the tuned channel.

When the scanned channel and previously stored channel are duplicated in accordance with the identical picture, at operation S240 the video processing apparatus 100 compares the SNR of the received channel with the SNR of the previously stored channel. At operation S250, when the SNR of the received channel is lower than the SNR of the previously stored channel, at operation S270, the video processing apparatus 100 determines whether the scan is applied to all frequencies. When the scan is applied to all frequencies, at operation S280, the scan is finished. On the other hand, when the scan is not applied to all frequencies, the video processing apparatus 100 returns to operation S210 and continuously performs the scan.

When the SNR of the received channel is higher than the SNR of the previously stored channel, at operation S260, the received channel is selected in accordance with the corresponding picture. Then, at operation S270, the video processing apparatus 100 determines whether the scan is applied to all frequencies. When the scan is applied to all frequencies, at operation S280, the scan is finished. On the other hand, when the scan is not applied to all frequencies, the video processing apparatus 100 returns to operation S210 and continuously performs the scan.

As described above, exemplary embodiments of the present invention provide a video processing apparatus and a video processing method, in which a video signal in accordance with an identical picture is received through a high quality channel to be processed and displayed.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A video processing method comprising:
   receiving video signals comprising channel information relating to at least one channel, and video identification information relating to an identity of a picture between signals;
   evaluating a receiving quality of each video signal in accordance with the video signals comprising same video identification information, but different channel information; and
   displaying a picture by processing a video signal comprising a desired receiving quality among the video signals.

2. The video processing method according to claim 1, wherein the step of evaluating the receiving quality comprises evaluating a signal-to-noise ratio (SNR) of the video signal, and
   the step of displaying the picture comprises determining the video signal comprising a highest SNR as the video signal comprising the desired receiving quality among the video signals.

3. The video processing method according to claim 1, further comprising controlling a memory to store the channel information, video identification information and information relating to the receiving quality of the video signals comprising the same video identification information, but different channel information.

4. The video processing method according to claim 3, wherein the channel information, video identification information and information relating to the receiving quality of the video signal are stored with priority in selecting the at least one channel.

5. The video processing method according to claim 3, wherein the channel information, video identification information and information relating to the receiving quality of the video signal are stored with additional information for noting that the at least one channel is duplicated corresponding to the identical picture.

6. A video processing apparatus comprising:
a signal receiver for receiving a video signal comprising channel information relating to at least one channel, and video identification information relating to an identity of a picture between signals;
a signal evaluator for evaluating a receiving quality of each video signal in accordance with the video signals comprising the same video identification information, but different channel information;
a video processor for processing a video signal to be displayed as a picture; and
a controller for controlling the video processor to process the video signal having a desired receiving quality among the video signals.

7. The video processing apparatus according to claim 6, wherein the signal evaluator evaluates a SNR of the video signal, and the controller determines the video signal comprising a highest SNR as the video signal comprising the best receiving quality among the video signals.

8. The video processing apparatus according to claim 6, further comprising an information storage for storing the channel information, video identification information and information relating to the receiving quality of the video signals having same video identification information, but different channel information.

9. The video processing apparatus according to claim 8, wherein the information storage stores the channel information, video identification information and information relating to the receiving quality of the video signal with priority in selecting the at least one channel.

10. The video processing method according to claim 8, wherein the information storage stores the channel information, video identification information and information relating to the receiving quality of the video signal with additional information for noting that the at least one channel is duplicated corresponding to the identical picture.

* * * * *